United States Patent [19]
Yamada et al.

[11] Patent Number: 5,141,237
[45] Date of Patent: Aug. 25, 1992

[54] STEEL LAMINATE GASKET WITH A PLATE INFORMATION DEVICE

[75] Inventors: Yoshio Yamada, Koshigaya; Yoshio Miyaoh, Tokyo, both of Japan

[73] Assignee: Ishikawa Gasket Co., Ltd., Tokyo, Japan

[21] Appl. No.: 358,074

[22] Filed: May 30, 1989

[30] Foreign Application Priority Data

May 28, 1988 [JP] Japan .................... 63-70582

[51] Int. Cl.⁵ .............................. F16J 15/08
[52] U.S. Cl. ........................... 277/2; 277/9; 277/235 B
[58] Field of Search ............ 277/2, 9, 233, 234, 277/235 B, 235 R, 236; 428/571, 192

[56] References Cited

U.S. PATENT DOCUMENTS

| | | | |
|---|---|---|---|
| 2,722,043 | 11/1955 | Nenzell | 277/9 X |
| 4,157,833 | 6/1979 | Kozlowski | 277/9 |
| 4,326,907 | 4/1982 | Bornefeld | 277/216 X |
| 4,648,607 | 3/1987 | Yamada et al. | 277/234 X |
| 4,776,601 | 10/1988 | Yamada | 277/234 X |

Primary Examiner—William A. Cuchlinski, Jr.
Assistant Examiner—Scott W. Cummings
Attorney, Agent, or Firm—Kanesaka and Takeuchi

[57] ABSTRACT

A steel laminate gasket with a plate information device is situated between two engine parts to be sealed. The gasket comprises at least one first metal plate and at least one second metal plate. The first metal plate is provided with a notch or hole inside the plate, and the second plate is provided with a plate information sign at an area corresponding to the notch or hole. Therefore, when the plates are assembled, the plate information sign can be seen through the notch or hole.

3 Claims, 1 Drawing Sheet

STEEL LAMINATE GASKET WITH A PLATE INFORMATION DEVICE

BACKGROUND OF THE INVENTION AND RELATED ART STATEMENT

The present invention relates to a steel laminate gasket with a plate information device so that a kind of gasket is readily recognized after the gasket is assembled.

In a steel laminate gasket, the gasket is formed of a plurality of steel plates. Since the outer configuration is substantially the same in all the steel plates, it is very difficult to recognize the plates after assembly.

Recently, efficiency of an engine has significantly advanced. Therefore, a top clearance between a piston at a top dead center and an inner top portion of a cylinder head is precisely selected, because the top clearance affects the power and exhaust gas of an engine.

The top clearance is generally determined when an engine is designed. However, since a gasket is installed between a cylinder head and a cylinder block, a precise adjustment of the top clearance is made by selecting the thickness of the gasket.

On the other hand, in order to efficiently utilize engines, the same engines are used for different models of cars. In this case, the engines are slightly modified to suit the respective models. The top clearance may be changed by changing the thickness of a gasket.

In case the thickness of a gasket is changed, one of plates is exchanged for a different plate with different thickness. Namely, in the same gasket, a plurality of plates with different thickness is prepared and used according to the models of the cars.

Before a gasket is assembled, it is easy to recognize the plates by marking signs on them. However, after the gasket is assembled, it is very difficult to recognize the plate used in the gasket, because the plate to be changed is not seen well from outside, i.e. sandwiched between upper and lower plates.

In U.S. Pat. No. 4,648,607, a steel laminate gasket with assembly order identification device is disclosed, wherein each plate is provided with projections. Assembly order can be identified by checking the projections when the gasket is assembled.

However, in this patent, the respective plates must have projections to identify the plates. Namely, even if the configuration of the plates is the same, since the respective plates have different projections, different cutting devices are required for cutting the respective plates. Therefore, this method is not proper in case at least one plate in a steel laminate gasket is to be identified.

Accordingly, one object of the invention is to provide a steel laminate gasket, wherein a steel plate situated in a middle of a gasket can be easily identified after the gasket is assembled.

Another object of the invention is to provide a steel laminate gasket as stated above, wherein all the plates can be manufactured by the same cutting device without using a different cutting device.

A further object of the invention is to provide a steel laminate gasket as stated above, which can be manufactured easily and economically.

Further objects and advantages of the invention will be apparent from the following description of the invention.

SUMMARY OF THE INVENTION

In accordance with the invention, a steel laminate gasket to be installed between two engine parts is provided with a plate information device. The gasket comprises at least one first metal plate for constituting the steel laminate gasket and at least one second metal plate stacked with the first metal plate.

The size of the first plate is substantially the same as that of the engine parts, and the first plate is provided with a plate information area inside the first plate. On the other hand, the second metal plate is provided with a plate information sign at an area corresponding to the plate information area of the first plate. Therefore, after the first and second metal plates are assembled, the plate information sign of the second metal plate is seen through the plate information area of the first plate.

In case a different second plate is used, a different plate information sign is affixed onto that second plate. Therefore, after the plates are assembled, it is easily recognized what kind of second plate is used.

The plate information area of the first plate may be a hole or a notch. Therefore, the plate information area does not project outside the engine parts.

DETAILED DESCRIPTION OF PREFERRED EMBODIMENTS

Figure 1:
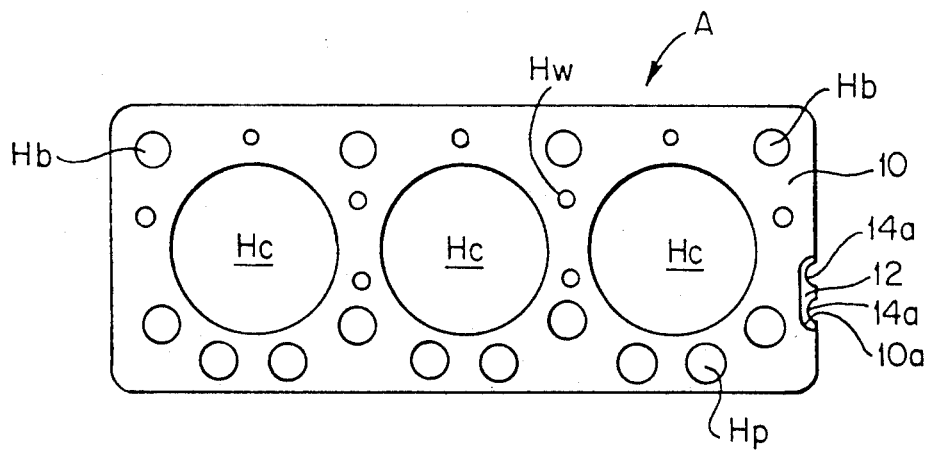
FIG. 1 is a plan view of a steel laminate gasket with a plate information device of the invention.
Figure 2:
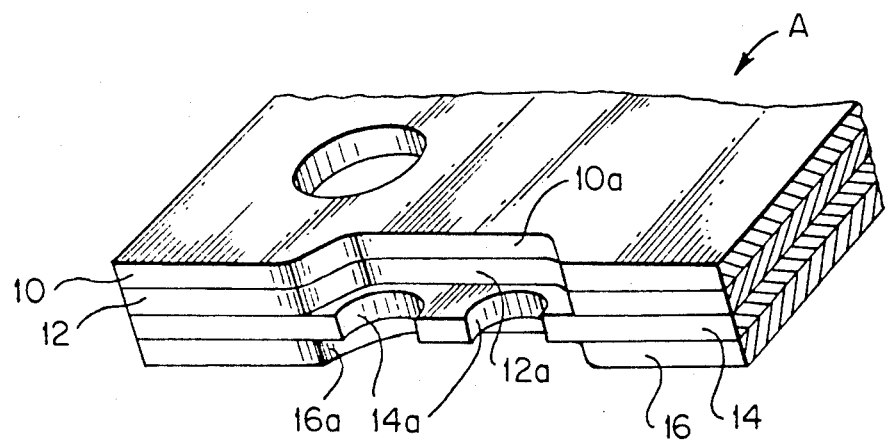
FIG. 2 is an enlarged perspective view for showing the plate information device.

Referring to FIGS. 1 and 2, a first embodiment A of a steel laminate gasket of the invention is shown. The gasket A is a water holes Hw, push rod holes Hp and so on, as in the conventional gasket. Sealing devices are formed around the cylinder holes Hc, water holes Hw and push rod holes Hp. However, since the sealing devices are not the subject matter of the present invention, the sealing devices are not shown in the drawings. Any kind of sealing devices may be used.

As shown in FIG. 2, the gasket A comprises an upper plate 10, middle plates 12, 14 and a lower plate 16. The outer configuration of the plates 10, 12, 14, 16 is substantially the same as a cylinder head and a cylinder block (both not shown). Therefore, nothing projects outwardly from the cylinder head and cylinder block when the gasket A is installed thereto.

The plates 10, 12, 16, however, have notches 10a, 12a, 16a at their side portions where sealing ability of the gasket A is not affected. When the gasket A is assembled, the notches 10a, 12a, 16a align vertically.

On the other hand, the plate 14 is provided with two dents 14a, which are located at an area where the notches 10a, 12a, 16a are positioned when the gasket A is assembled. The dents 14a constitute signs for the plate 14. Therefore, even after the plates are assembled, the dents 14a of the plate 14 can be seen through the notches 10a, 12a or notch 16a.

In the gasket A, the plate 14 is a plate for adjusting the thickness of the gasket A. Therefore, when the thickness of the gasket A is changed, the plate 14 is replaced by a different plate with different sign. The sign can be seen through the notches of the plates 10, 12, 16.

In the gasket A, even after the plates 10, 12, 14, 16 are assembled, the sign of the plate 14 can be easily seen. As a result, the thickness of the gasket A is readily understood.

Figure 3A:
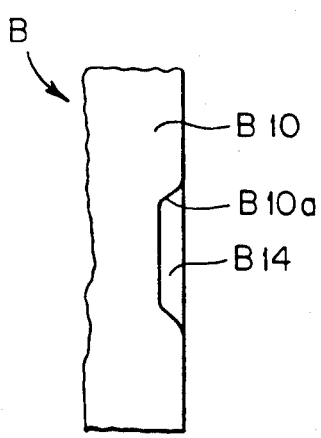
FIGS. 3A and 3B are explanatory plan views for showing different embodiments of the plate information device.
Figure 3B:
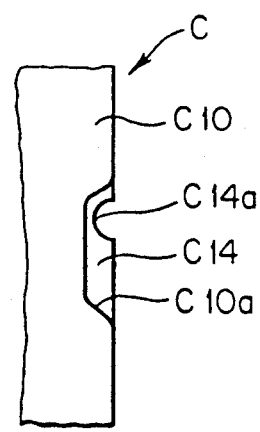

FIGS. 3A and 3B are explanatory plan views of the embodiments B and C of the present invention. In the gasket B, plates B10, B12, B16 (plates B12, B16 are not shown), which are the same as the plates 10, 12, 16, are used. However, the plate B14 situated between the plates B12, B16 is different in thickness from the plate 14, so that the plate B14 does not have any dent. The plate B14 can be seen through a notch B10a. As a result, the difference of the gaskets A, B can be easily recognized.

In FIG. 3B, a plate C14 with a dent C14a is used instead of a plate 14 in the gasket A. The dent C14a can be seen through a notch C10a of a plate C10.

Figure 4:
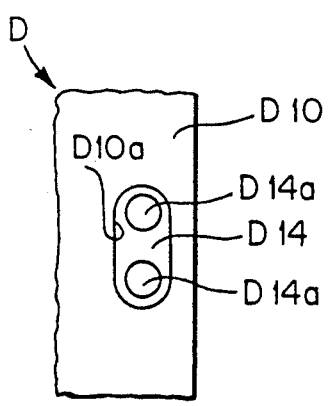
FIG. 4 is an explanatory plan view for showing a still different embodiment of the plate information device.

FIG. 4 shows a fourth embodiment D of a steel laminate gasket of the invention, wherein plates D10, D12, D16 (D12, D16 are not shown) similar to the plates 10, 12, 16 have elongated holes D10a, D12a, D16a (D12a, D16a are not shown) instead of the notches. A plate D14 has two holes D14a at an area corresponding to the elongated holes D10a, D12a, D16a. Therefore, the holes D14a can be seen through the elongated holes. Even if the elongated holes are formed instead of the notches, the gasket D operates as in the gasket A.

In the present invention, a plate which may be changed when the thickness of a gasket is altered is provided with a plate information sign, and the other plates are provided with notches or holes so that the plate information sign can be seen from the notches or holes. Therefore, when the plates are assembled, the plate with the plate information sign can be seen to identify the gasket.

In the present invention, notches or holes are formed inside the plate. Namely, none of the portions projects outwardly when the gasket is installed in an engine. Therefore, the gasket does not hinder installation of other parts of a car.

Further, since the plates have the same outer configuration possible to use the same cutting device for cutting the plates. Pins for cutting the holes or notches may be attached to the cutting device when required. As a result, the gasket can be manufactured economically.

While the invention has been explained with reference to the specific embodiments of the invention, the explanation is illustrative, and the invention is limited only by the appended claims.

What is claimed is:

1. A steel laminate gasket with a plate information device adapted to be placed between two engine parts to be sealed, comprising,
a plurality of first metal plates for constituting the steel laminate gasket, each first plate having a size corresponding to sizes of the engine parts to be sealed, and a plate information area in the form of a hole or a notch, said plate information areas being located inside the first plates so that when the first plates are assembled and piled together, the plate information areas align together exactly without extending outside of the engine parts, and
at least one second metal plate having a certain thickness situated between the first metal plates and having a plate information sign in an area corresponding to the plate information areas of the first metal plates, said plate information sign of the second metal plate, when the firs and second metal plates are assembled and piled together, being positioned in the area corresponding to the plate information areas of the first metal plates so that the plate information sign can be seen through the plate information areas, whereby different second plates having various thicknesses with corresponding information signs may be identified by its particular information sign when viewed through said plate information areas.

2. A steel laminate gasket according to claim 1, wherein the the plate information sign is at least one notch.

3. A steel laminate gasket according to claim 1, wherein said second plate has a size substantially corresponding to the first metal plate.

* * * * *